Patented Dec. 19, 1939

2,183,856

UNITED STATES PATENT OFFICE 2,183,856

CONDENSATION PRODUCTS OF HYDROLIZED PROTEIN MATERIAL AND THEIR MANUFACTURE

Georg Meyer, Cologne-Mulheim, Germany, assignor to General Aniline Works, Inc., New York, N. Y., a corporation of Delaware No Drawing. Application June 15, 1937, Serial No. 148,312. In Germany March 24, 1933

3 Claims. (Cl. 260—529)

This invention relates to valuable condensation products of totally hydrolized protein material for the treatment of textiles, leather and the like. This application is a continuation in part of my copending application Serial No. 1,433, filed January 1935, now Patent #2,143,490.

I have found that products of high technical value are obtained from mixtures of simple aminocarboxylic acids, such as can be obtained by total hydrolysis of proteins or substances containing the same, by acylating the said mixtures with the radicals of organic sulfo acids of the group consisting of sulfonic acids and sulfaminic acids.

The aminocarboxylic acid mixtures serving as initial materials for the manufacture of the condensation products may be obtained by complete hydrolysis of natural protein substances or animal or vegetable materials containing the same such, for instance, as albumin, glutin, protein material from wheat, yeast, soy bean flour and the like. The cheap wastes from the tanneries and slaughterhouses and also the wastes of leather, horn, hair and wool may be advantageously employed. The decomposition of the said protein materials may be performed in accordance with known methods, for instance by heating with water, aqueous acids or alkalis. Depending on the nature of the material employed, different mixtures of aminomonocarboxylic acids are obtained such, for instance, as glycocoll, alanin, leucin, prolin, hydroxyprolin, aminodicarboxylic acids such, for instance, as aspartic acid, glutaminic acid and the like, basic aminocarboxylic acids and substitution products thereof, such, for instance, as lysin and arginin. This aminocarboxylic acid mixture may be pretreated, if desired, with alkylene oxides, preferably at elevated temperatures, before acylating it.

As sulfonic acids which can be used for the purpose of the present invention there may be mentioned for instance: butyl sulfonic aid, high molecular saturated, unsaturated and halogenated aliphatic sulfonic acids, dichlorbenzyl sulfonic acid, diisobutylnaphthalene sulfonic acid and xylene sulfonic acids. The dodecyl methyl sulfaminic acid may be mentioned as an example of a substituted sulfaminic acid.

The condensation of the said acids with the aminocarboxylic acid mixture is performed in the usual manner, if desired in the presence of organic solvents as, for example, alcohols or hydrocarbons. Instead of using the free acids, I prefer to employ their reactive derivatives, more especially the acid chlorides derived therefrom. In this case, the reaction is advantageously performed in the presence of alkalis or other indifferent acid-binding substances like pyridin.

The manufacture of these condensation products is very cheap in view of the fact that the cheap wastes of protein-containing substances can be used as starting materials. The new products are particularly distinguished by their good solubility in water; for instance, they are not or only very difficultly to be salted out from their concentrated solutions by the addition of inorganic substances. Moreover, they display a good resisting capacity towards hard water.

Depending on the nature of the group introduced into the aminocarboxylic acid mixture, the products possess a good wetting, washing, emulsifying, equalizing or dispersing effect; therefore, they can be advantageously employed as auxiliary agents in the manufacture and amelioration of fabrics of all kinds, particularly of textiles and leathers. They are particularly suitable as substitutes for or admixtures to soaps in the various processes of the textile industry, especially in all cases in which the sensitiveness of ordinary soaps to salts, for instance of alkaline earths or heavy metals, causes trouble. Such processes are for instance washing, wetting, bucking, bleaching, drumming, dyeing with vat, naphthol, sulfur or azo dyestuffs, after-treating or stripping dyed material, preparing of emulsions of fats, oils, fatty acids, waxes, wax-like substances or paraffin, sizing, impregnating, dressing, finishing and the like. Furthermore, they can be employed for pasting or dissolving dyestuffs or pre-products thereof, for rendering dyed material fast to rubbing, and the like.

In many cases, the new products can be employed in combination with other agents such, for instance, as soaps, Turkey red oils, alkylnaphthalene sulfonic acids, condensation products of high molecular carboxylic acids with hydroxy or amino alkyl sulfonic acids, sulfonates of fatty alcohols, glue, starch, soluble gums, mucilages, alcohols, ketones, hydrocarbons, halogenated hydrocarbons and the like.

The following examples illustrate the invention, without, however, restricting it thereto, the parts being by weight:

Example 1

100 parts of a 40 per cent solution of a technical mixture of aminocarboxylic acids (obtained by heating skinwaste with soda lye to about 140–150° C. for 12 hours) are mixed, at room-temperature, with a solution consisting of 32 parts of octadecylsulfochloride in 30 parts of ether and 110 parts of concentrated soda lye. Thereupon the ether is evaporated by a 1 hour's stirring at 100° C. and the conversion thus finished.

The aqueous solutions of the condensation product thus obtained are strongly foaming and possess good washing-, wetting-, dispersing-, equalizing- and softening power.

Example 2

28 parts of dodecylmethylsulfaminic acid chloride (obtained from dodecylmethylamine hydrochloride and sulfurylchloride), dissolved in 50 parts of acetone, and about 53 parts of 2-n-soda lye are slowly added at a temperature of 90° C. to 100 parts of a mixture of aminocarboxylic acids prepared at 140–150° C. according to Example 1. During the addition of soda lye the reaction mixture is kept weakly alkaline. To complete the conversion the mixture is heated to 90° C. for another hour and the solvent evaporated.

The conversion product is a viscous paste of excellent capillary active properties; with water it forms strongly foaming solutions.

Example 3

37 parts of stearic acid methylamido sulfonic acid chloride (prepared from stearic acid methylamide and sulfurylchloride), dissolved in 75 parts of acetone, are added drop by drop at 90° C. to 100 parts of a 40 per cent solution of a mixture of aminocarboxylic acids obtained according to Example 1. By simultaneously adding soda lye the reaction mixture is kept weakly alkaline. For completion of the conversion the mixture is kept at 90° C. for another hour; subsequently the solvent is evaporated.

The aqueous solution of the condensation product thus obtained is strongly foaming; it can be advantageously employed for treating textile material.

I claim:

1. The products essentially comprising a mixture of aminocarboxylic acids obtainable by totally hydrolyzing protein materials, said aminocarboxylic acids being acylated with high molecular aliphatic sulfo acid radicals selected from the group consisting of sulfonic acid radicals and sulfaminic acid radicals.

2. The products essentially comprising a mixture of aminocarboxylic acids obtainable by totally hydrolizing protein materials, said aminocarboxylic acids being acylated with the radical of octadecyl sulfonic acid.

3. The process which comprises condensing a mixture of aminocarboxylic acids obtainable by totally hydrolizing protein material with a chloride of a high molecular aliphatic sulfo acid being selected from the group consisting of sulfonic acids and sulfaminic acids.

GEORG MEYER.